Jan. 19, 1960     A. W. KLOMP     2,921,450
UNIVERSAL JOINT
Filed Aug. 14, 1958
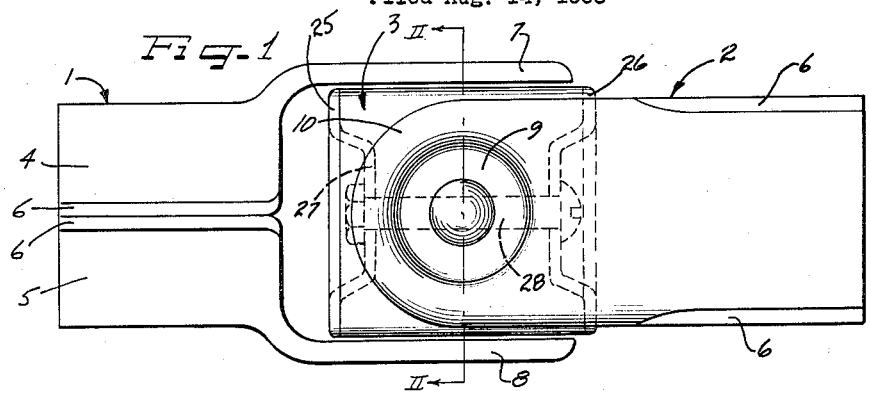
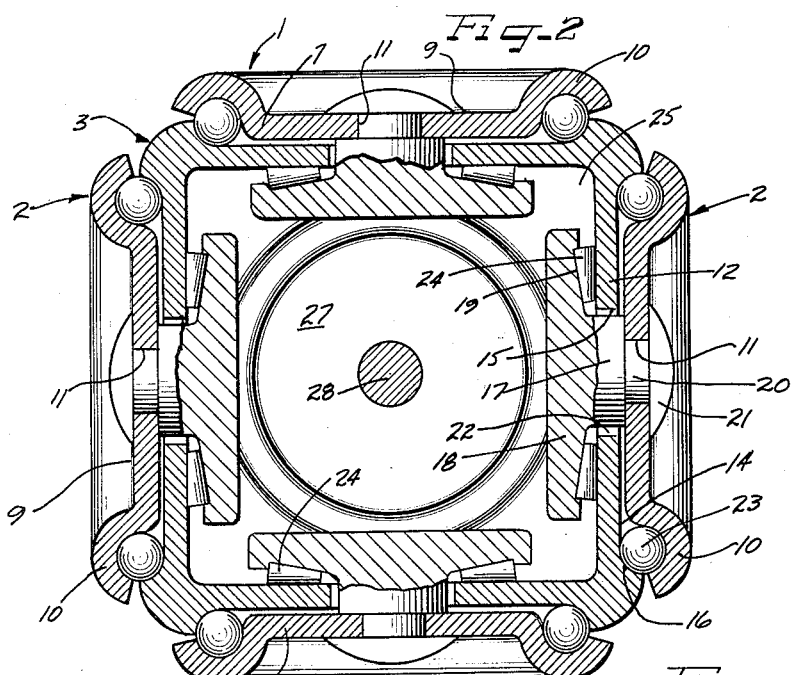
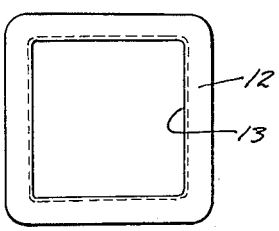
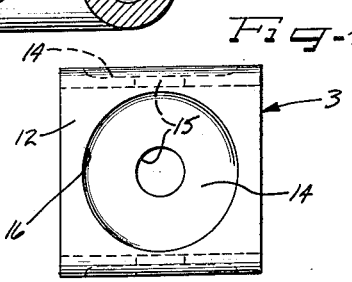
Inventor
Alfred W. Klomp

United States Patent Office 2,921,450
Patented Jan. 19, 1960

2,921,450

UNIVERSAL JOINT

Alfred W. Klomp, Detroit, Mich., assignor to Process Gear and Machine Company, Detroit, Mich., a corporation of Michigan Application August 14, 1958, Serial No. 755,045

11 Claims. (Cl. 64—17)

This invention relates to improvements in a universal joint, and more particularly to a universal joint highly desirable for usage wherever a Cardan type joint is utilized, although by virtue of the extremely high load carrying capacity of the joint in comparison with the overall size of the joint, it will have many other uses and purposes as will be apparent to one skilled in the art.

The instant invention is an improvement of the universal joint set forth, described, and claimed in my U.S. Letters Patent entitled "Universal Joint," No. 2,783,626, issued March 5, 1957. The instant invention possesses most of the advantages of the joint shown in my aforesaid patent, yet is more economically and facilely assembled, and is capable of carrying a greater load by virtue of added friction reducing bearing contacts between the component parts of the joint.

In the past, many and various types of universal joints of the economical Cardan or Hooke types have been manufactured, but these formerly known joints have proven objectionable for various reasons, including those stated in my aforesaid patent. In addition, it may be mentioned that joints of the economical type heretofore produced did not avoid rubbing contact at the bearing surfaces, and required considerable machining of those bearing surfaces in their manufacture which added materially to the cost and rendered the joint obviously short lived. Furthermore, insofar as joints heretofore manufactured were concerned, insofar as I am aware, there has not been any joint which produced bearing contact at a plurality of places between each arm of the yoke member and the body member of the joint, and these formerly known joints were not designed for facile assembly in an economical and efficient manner, nor did any of them embody the bearing carrying means made integral with the arms of the yoke members.

With the foregoing in mind, it is an important object of the instant invention to provide a simple and economical universal joint which has more load carrying capacity than any joint of equal size heretofore produced.

Another object of the instant invention resides in the provision of an economical type of universal joint so constructed as to lend itself to extremely rapid assembly line manufacture.

A further feature of the instant invention resides in the provision of an economical Cardan type universal joint which has rolling bearing contact between each arm of the yoke members and both the outside and inside faces of the body member, whereby the load carrying capacity of the joint is greatly increased with only a negligible increase in the cost of manufacture.

A further object of the instant invention resides in the provision of a Cardan type universal joint having a box-like body member, and so constructed as to provide ball bearing contact between each arm of the yoke members and an outside face of the body member, with roller bearing contact between each arm of the yoke members and the inside face of the body member.

Still a further feature of the instant invention resides in the provision of a simple and economical form of universal joint having all bearing carrying means made substantially integral with the arms of the yoke members.

Another object of the instant invention resides in the provision of a universal joint having only rolling contact between the arms of the yoke members and the body member as distinguished from rubbing contact, and which is so constructed that all four yoke arms may be simultaneously secured or connected in operative association with the body member.

Also an object of the instant invention is the provision of an economical type universal joint so constructed as to distribute bearing contact between the components of the joint over a wide range so that tracking by virtue of the bearing means is substantially negligible and the joint is therefore materially longer lived.

Still a further object of the instant invention is the provision of an economical type universal joint so constructed that tracking or grooving of the bearing means has a negligible effect and adjustment of the joint is never necessary.

While some of the more salient features, characteristics, and advantages of the instant invention have been above pointed out, others will become apparent from the following disclosures, taken in conjunction with the accompanying drawing, in which Fig. 1 is a plan view of a universal joint embodying principles of the instant invention;

Fig. 2 is a greatly enlarged transverse sectional view through the center of the joint, taken substantially as indicated by the line II—II of Fig. 1, looking in the direction of the arrows;

Fig. 3 is a reduced end view illustrating the initial step in the making of the body part of the joint; and Fig. 4 is a side view of the structure of Fig. 3 illustrating further steps in the making of the body part of the joint.

As shown on the drawings:

In the illustrated embodiment of the instant invention, there is shown a universal joint of the Cardan type including a yoke member generally indicated by numeral 1, a like yoke member generally indicated by numeral 2, and a boxlike body member generally indicated by numeral 3. Both yoke members are identical in construction, but one of them is, of course, disposed at a 90° angle relatively to the other. Since they are alike, only one need be described herein.

These yoke members 1 and 2 are quite similar in construction to those more fully set forth and described in my aforesaid patent. Each yoke member comprises a pair of identical stampings 4 and 5. Each stamping includes a substantially half round hub portion flanged on opposite sides thereof as indicated at 6—6, and the flanges of opposed yoke members are firmly secured together, as by welding or in an equivalent manner. These hub portions, of course, are arranged for telescopic association with the ends of driving and driven shafts, as the case may be since it makes no difference which yoke member 1 or 2 is connected with the driving or driven shaft.

Each yoke member also possesses a pair of opposed arms 7 and 8 for connection with the body member 3 of the joint. In the illustrated instance, the half yoke member having the hub portion 4 carries the arm 7, while the half yoke member having the hub portion 5 carries the arm 8. Each arm is recessed centrally as indicated at 9 to define a substantially annular half ball race 10. An aperture 11 is provided in each arm centrally of the ball race.

With reference more particularly to Figs. 3 and 4, it will be seen that the boxlike body member 3 of the joint is preferably formed by severing a section 12 from the end of a substantially square tube of indefinite length. This section 12 is then preferably internally broached as indicated by the dotted line 13 in Fig. 3 to provide uniform wall thickness throughout the section and also assure flat interior faces. The body section 12 is next machined on each external face thereof to provide a circular flat face 14 of substantially half the thickness of the metal, which dimension however is not essential. Centrally of the face 14 an aperture 15 is provided. The face 14, while being flat, has a circumferential arcuate wall 16 to define half a ball race and cooperate with the half ball race 10 on the respective arm of a yoke member.

In each instance, the arms of the yoke members are operatively connected with the boxlike body member 3 by means of a rivet element, each such element comprising a body 17 having an enlarged head 18 on the inner end thereof. The head is provided, by machining or any suitable manner, with a conical or sloping bearing race as indicated at 19. At the opposite end thereof, the body 17 carries a reduced shank 20 which initially is substantially round throughout its entire length, but which when the parts are united is crushed at its outer end by any suitable riveting mechanism to provide a head 21 externally of the respective yoke arm. As seen best in Fig. 2, the shank 20 extends through the aforesaid aperture 11 in a yoke arm and after the riveting operation completely fills the aperture. On the other hand, the body portion 17 of the rivet element is of less size than the aperture 15 in the respective face of the body member, so there is a space 22 around the body of the rivet element to prevent any bearing or contact between the body of the rivet element and the body member at that point. Accordingly, there is no rubbing contact between any parts of the assembled joint.

Now in order to establish rolling or so-called antifriction contact between the parts of the assembled joint, as distinguished from any sliding or rubbing contacts, a ring of ball bearings 23 are disposed in each ball bearing race defined conjointly by a circumferential arcuate portion 16 on a face of the body member, and the formation 10 on an arm of a yoke member. Usually, twelve or more balls will be used in each such ball race, depending of course upon the size of the joint. Consequently, there will be only rolling action between each arm of the yoke members and the respective outer face of the boxlike body member. At the same time, rolling action is established between each arm of the yoke member and the respective inner face of the boxlike body member by virtue of a ring of tapered roller bearings 24 disposed between the sloping bearing face 19 on the inner head of the rivet element and the adjacent inside flat face of the bearing body. These roller bearings are preferably in the shape of truncated cones having a longitudinal slope consistent with the slope of the bearing raceway 19 on the rivet element head 18. Accordingly, antifriction or rolling action is established between each arm of the yoke members and both the inside and outside faces of the respective wall or side of the boxlike body member.

The open ends of the body member may be closed in any desirable manner. To this end, I have illustrated a cap 25 for one end of the body member and a like cap 26 for the other end, as seen in Fig. 1. Each of these caps is centrally recessed as at 27 to accommodate the head and nut of a bolt 28 extending through the body of the joint and engaging both caps. Of course, gaskets may be utilized if desired. Likewise, lubricant may be placed within the interior of the body member and maintained therein by any suitable packing, if so desired, which packing may be of the nature of that disclosed in my aforesaid U.S. Letters Patent. Such lubricant may readily enter the raceway for the roller bearings, and ultimately reach the ball raceways through the apertures 22 in the side walls of the body member.

The instant invention may be very readily and facilely assembled. It is simply necessary to place ball bearings in the respective ball races, and roller bearings in the respective raceways 19 wherein the balls and rollers will remain during assembly, being held by a chilled lubricant. The four rivet elements may be disposed in proper position, and all four riveting operations may be done simultaneously by the simple insertion of a square anvil inside the body member against the enlarged heads 18 on the rivet elements. Of course, one or more of the riveting operations may be done at a time, if desired, but the simplest manner is to perform all four such operations simultaneously. After the rivet elements are thus made substantially integral with the respective arm of a yoke member, the caps 25 and 26 may be placed on the ends of the body member, secured by the bolt 28, and the operation is completed.

From the foregoing, it is apparent that I have provided a simple and economical form of universal joint, wherein there is no sliding or rubbing friction developed anywhere in the joint, but only rolling contact between the respective joint members. Rolling and ball bearings only provide contact at the friction points, and it will be especially noted that for each yoke member arm, there is such bearing contact on the outside face and the inside face of the respective wall of the body member, whereby the joint is enabled to carry a greater load than would otherwise be the case, and a greater load than joints of equivalent size heretofore manufactured.

It will be understood that modifications and variations may be effected without departing from the scope of the novel concepts of the present invention.

I claim as my invention:

1. In a universal joint, a pair of yoke members each having a pair of opposed arms, a hollow body member having a wall for confronting relationship with each said arm, each said wall having an aperture therein, a rivet element extending through each said wall aperture and engaged with the respective yoke arm, an enlarged head on the inner end of each said rivet element, and bearing means between each said head and the inside face of the respective body wall.

2. In a universal joint, a pair of yoke members each having a pair of opposed arms, a hollow body member having a wall for confronting relationship with each said arm, each said wall having an aperture therein, a rivet element extending through each said wall aperture and engaged with the respective yoke arm, an enlarged head on the inner end of each said rivet element, and roller bearings between each said head and the respective body wall, each said rivet element extending freely through the body wall aperture out of contact with the body wall.

3. In a universal joint, a pair of yoke members each having a pair of opposed arms, a hollow body member having a wall for confronting relationship with each said arm, each said wall having an aperture therein, a bearing supporting member joined integrally with each arm and extending freely through the respective wall aperture, an enlarged head on said bearing supporting member inside said body member, and bearings between said head and the inside face of the respective body wall.

4. In a universal joint, a pair of yoke members each having a pair of opposed arms, a hollow body member having a wall for confronting relationship with each said arm, each said wall having an aperture therein, a bearing supporting member joined integrally with each arm and extending freely through the respective wall aperture, an enlarged head on said bearing supporting member inside said body member, said head having an outer sloping face defining a bearing race, and tapered roller bearings acting between said sloping face and the inner face of the respective body member wall.

5. In a universal joint, a pair of yoke members each having a pair of opposed arms, a hollow body member having a wall for confronting relationship with each said arm, each said wall having an aperture therethrough, bearing supporting means on each said arm and extending in part through the respective said aperture, and bearings held in place by said arm and said means acting on both the inside and outside faces of the respective said wall.

6. In a universal joint, a pair of yoke members each having a pair of opposed arms, a hollow body member having a wall for confronting relationship with each said arm, bearing supporting means carried by each said arm and disposed relatively to the respective said wall to hold in place bearings outside and inside the hollow of said body member acting against both the outside and inside faces of the respective wall, and bearings disposed in such locations.

7. In a universal joint, a pair of yoke members each having a pair of opposed arms, a hollow body member having a wall for confronting relationship with each said arm, bearing supporting means carried by each said arm and disposed relatively to the respective said wall to hold in place bearings acting against both the outside and inside faces of the respective wall, a ring of ball bearings riding the outside face of the wall, and a ring of roller bearings inside the hollow of said body member riding the inside face of the wall.

8. In a universal joint, a pair of yoke members each having a pair of opposed arms, a hollow body member having a wall for confronting relationship with each said arm, bearing supporting means carried by each said arm and disposed relatively to the respective said wall to hold in place bearings outside said body member and inside the hollow thereof acting against both the outside and inside faces of the respective wall, and rolling bearings disposed in each of such locations, said arm and supporting means being free of any contact or connection with said wall other than by way of said bearings.

9. In a universal joint, a pair of yoke members each having a pair of opposed arms shaped to define a part of a bearing race and having an aperture centrally of the race, a hollow body member having a wall for confronting relationship with each of said arms, each said wall having a flat inner face and being of reduced thickness and flat on its outer face in the confronting region thereof, said flat outer face being bounded by a surrounding arcuate shaping defining the other part of the bearing race for the respective arm and said wall having an aperture centrally of said shaping, a member extending through said apertures and rigidly secured to the arm, an enlarged head on the inner end of the last said member, bearings in said race, and rolling bearings between each said head and the inner flat face of the respective wall.

10. In a universal joint, a pair of yoke members each having a pair of opposed arms shaped to define a part of a bearing race and having an aperture centrally of the race, a hollow body member having a wall for confronting relationship with each of said arms, each said wall having a flat inner face and being of reduced thickness and flat on its outer face in the confronting region thereof, said flat outer face being bounded by a surrounding arcuate shaping defining the other part of the bearing race for the respective arm and said wall having an aperture centrally of said shaping, a member extending through said apertures and rigidly secured to the arm, a laterally enlarged head having a conical outer face on the inner end of the last said member, a ring of ball bearings in each race compositely defined by an outer wall face and each arm, and a ring of tapered roller bearings between each said head and the respective flat inner wall face.

11. In a universal joint, a pair of yoke members each having a pair of opposed arms, a hollow body member having a wall for confronting relationship with each said arm, each said wall having an aperture therethrough, bearing supporting means on each said arm and extending in part through the respective said aperture, and bearings held in place by said arm and said means acting on both the inside and outside faces of the respective said wall, a cap over each open end of said body member, and means extending through said body member clamping said caps in place.

References Cited in the file of this patent
UNITED STATES PATENTS

| | | |
|---|---|---|
| 2,447,882 | Warner | Aug. 24, 1948 |
| 2,783,626 | Klomp | Mar. 5, 1957 |

FOREIGN PATENTS

| | | |
|---|---|---|
| 702,745 | Great Britain | Jan. 20, 1954 |